United States Patent
Sun et al.

[11] Patent Number: 5,991,768
[45] Date of Patent: *Nov. 23, 1999

[54] FINER GRAINED QUIESCENCE FOR DATA REPLICATION

[75] Inventors: Harry Sun, Redwood City; Alan Downing, Fremont; Benny Souder, Belmont; James Stamos, Saratoga, all of Calif.; Ashvin Goel, Portland, Oreg.

[73] Assignee: Oracle Corporation, Redwood Shores, Calif.

[*] Notice: This patent is subject to a terminal disclaimer.

[21] Appl. No.: 08/865,818

[22] Filed: May 30, 1997

Related U.S. Application Data

[63] Continuation-in-part of application No. 08/667,677, Jun. 21, 1996, Pat. No. 5,799,306.

[51] Int. Cl.[6] ................................................ G06F 17/30
[52] U.S. Cl. .................... 707/104; 707/10; 707/200; 707/203; 707/204; 707/205; 395/200.35; 395/200.62; 395/182.18; 395/200.54
[58] Field of Search ............................ 707/10, 104, 200, 707/203, 204, 205; 395/200.35, 200.53, 200.54, 200.59; 706/13, 16, 25, 31; 455/12.1; 370/397

[56] References Cited

U.S. PATENT DOCUMENTS

| | | | |
|---|---|---|---|
| 5,577,211 | 11/1996 | Annapareddy et al. | 395/200.62 |
| 5,664,173 | 9/1997 | Fast | 707/4 |
| 5,684,945 | 11/1997 | Chen et al. | 395/182.18 |
| 5,765,165 | 6/1998 | Harper | 707/104 |
| 5,771,669 | 6/1998 | George et al. | 395/200.54 |

*Primary Examiner*—Thomas G. Black
*Assistant Examiner*—Diane D. Mizvchi
*Attorney, Agent, or Firm*—McDermott, Will & Emery

[57] ABSTRACT

A method and apparatus for performing an administrative function on an object, replicated at a plurality of sites, suspends or "quiesces" replication activities at the granularity of an object group. Each object resides in an object group, and each object group has a status flag that indicates whether replication activities are quiesced. In response to detecting a request to perform an administrative function on an object, replication activities are suspended for the object group. Previous transactions are propagated to other sites. When each site has propagated all the previous transactions, the administrative function is performed and replication activities for the object group are resumed.

18 Claims, 3 Drawing Sheets

FINER GRAINED QUIESCENCE FOR DATA REPLICATION

RELATED APPLICATIONS

The present application is a continuation-in-part of U.S. application Ser. No. 08/667,677, entitled "Method and Apparatus for Facilitating Data Replication Using Object Groups," filed by Harry Sun and Benny Souder on Jun. 21, 1996 (client docket no. OID-1995-33, attorney docket no. 3018-002), and now U.S. Pat. No. 5,799,306.

FIELD OF THE INVENTION

The present invention relates to database management and more particularly to data replication in a distributed database.

BACKGROUND OF THE INVENTION

Under certain conditions, it is desirable to store copies of a particular body of data, such as a relational table, at multiple sites. If users are allowed to update the body of data at one site, the updates must be propagated to the copies at the other sites in order for the copies to remain consistent. The process of propagating the changes is generally referred to as replication. Various mechanisms have been developed for performing replication. Once such mechanism is described in U. S. patent application Ser. No. 08/126,586 abandoned entitled "Method and Apparatus for Data Replication", filed on Sep. 24, 1993 by Sandeep Jain and Dean Daniels, the contents of which are incorporated by reference.

One problem with prior methods of replication pertains to performing administrative operations relating to data replication. Administrative operations differ from a simple modification of a body of data because they affect "metadata," information about the body of data that is separately stored by the database system. Examples of administrative operations include adding a new table to a database, adding a column to a table, deleting a column from a table, and changing the type of a column in a table. Although there are various kinds of administrative operations, all of them are characterized by the fact that they require an update to metadata, which is separately stored by the database.

It is important to ensure that changes due to administrative operations are propagated to all sites where a body of data is replicated to avoid inconsistent updates. For example, a table may be replicated with copies at three sites. At one site, a user may perform an administrative operation to add a column to a table. Shortly thereafter, that change is propagated to another site, where another user subsequently updates a value in the new column. With asynchronous replication, it is possible for these transactions to be replicated to the third site in an order that does not reflect the order in which the transactions actually occurred. Consequently, the third site may receive the administrative operation after the receiving the replication request for updating a value in column that does not yet exist at the third site.

In addition, it is important to ensure that changes due to other kinds of administrative operations, such as replication administration, be propagated consistently. For instance, a user may add a new replication site, modify conflict resolution rules, change the method of propagation (i.e., asynchronous or synchronous) between sites, or other configuration changes. All of these scenarios require a consistent application across replication sites.

Consequently, before any administrative operations are performed at one site for a particular body of data, any activities requiring replication for that body of data must be suspended, or "quiesced," at all sites. Quiescence allows all previously made replication activities to complete, so that all replicated modifications may be performed consistently with respect to the administrative environment at each site. Thus, replication is quiesced at all sites to prevent inconsistent modifications to replicated data.

In conventional methods, quiescence is performed at the database level. In other words, if an administrative task is to be performed for a particular body of data, the entire database is quiesced, even if that administrative task does not affect the validity of transactions performed on other bodies of data. Thus, a single body of data requiring quiescence is sufficient to suspend system replication activities for the entire database system.

On a large database system with many groups of unrelated bodies of data, quiescing the entire database system can substantially affect system availability. System-wide quiescence effectively places the entire system off-line, even though most of the transactions being performed may be unaffected by the administrative task. For these systems, database administrators have found it necessary to schedule their administrative tasks in advance or during the middle of the night.

Consequently, conventional methods of quiescence limit the usability and availability of database systems. In particular, database level quiescence is inefficient because replication activities are suspended for data objects unrelated or unaffected by the need to perform a particular administrative task. Accordingly, it is desirable to have a method and mechanism for performing quiescence that does not cause the entire database system to become unavailable.

SUMMARY OF THE INVENTION

One aspect of the invention is a method and apparatus for performing an administrative function on a body of data at one site out of many sites that replicate the body of data. Subsets of data are mapped to one or more object groups and one or more replication sites are specified for each object group. In response to detecting a request to perform the administrative function on data in an object group, new transactions on all data within the object group at all replication sites are suspended. Then, each site's previous transactions are propagated to the other replication sites. When all the previous transactions are propagated, the administrative function is performed on the data at all the replication sites. After the application of the administrative function is complete, transactions to data within the object group are resumed.

By only suspending and resuming replication activities for an object group, quiescence is performed at a finer level of granularity. In this manner, updates to unrelated data, in another object group, may continue despite the quiescence of replication activity for the former object group.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and system for performing an administrative function on data are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
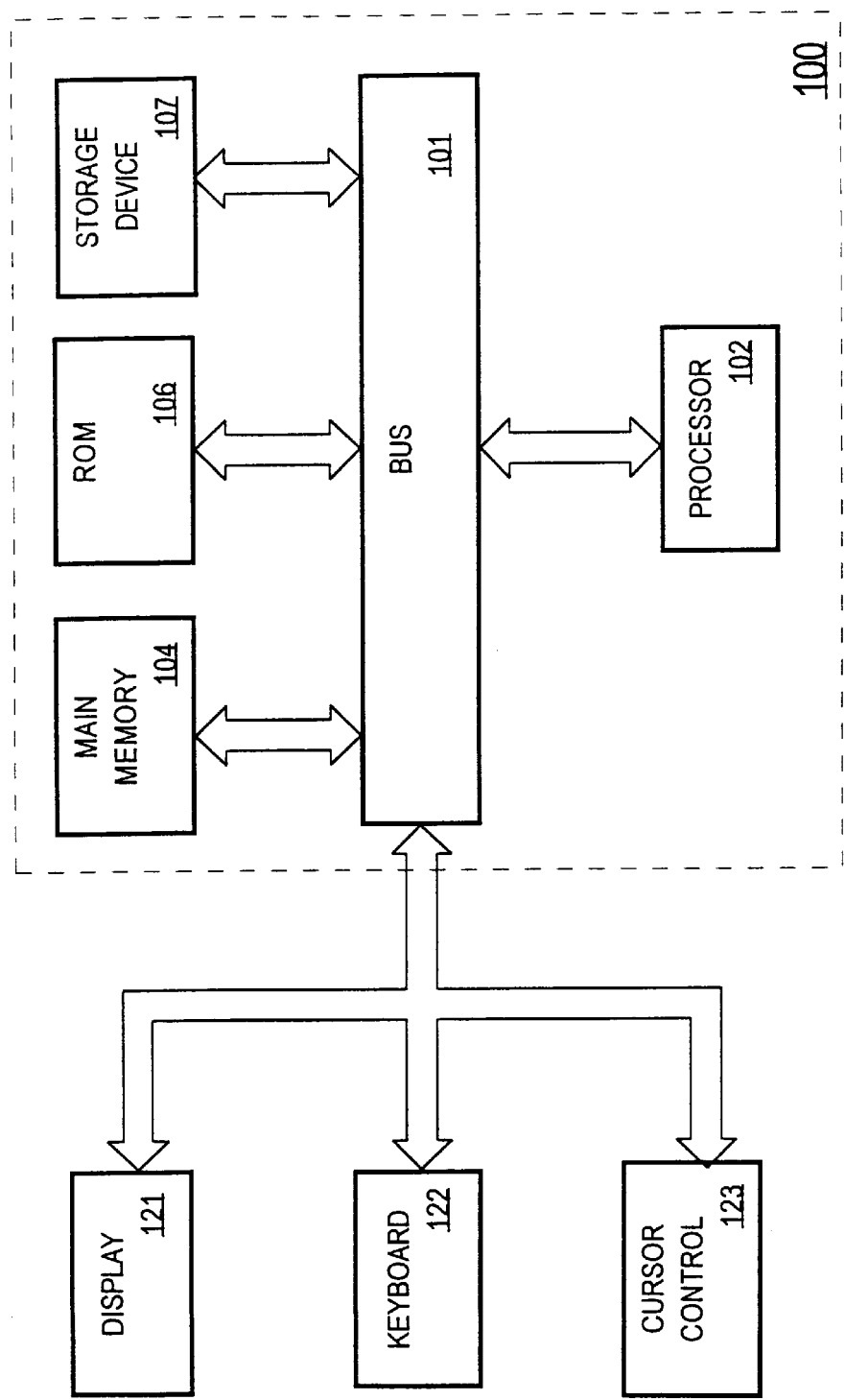
FIG. 1 is a high-level block diagram of a computer system that may be used to implement the present invention.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to perform an administrative function on a replicated body of data. According to one embodiment, performing an administrative function on a replicated body of data replicated is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

OBJECT GROUPS

An object group is a set of metadata that maps objects to logical groups. Object groups enable related objects to be grouped according to their logical relationship. Thus, when one member of an object group is modified, changes are propagated to all the sites at which the object group is replicated. For example, one object in an object group may refer to data in another object. By placing both these objects in the same object group, the database system can ensure that both objects are replicated to each site. Accordingly, object groups promote consistent replication because changes to one object of an object group are propagated along with changes to other objects in the object group.

Each object group includes a status flag that indicates whether activities causing replication of data that belongs to the object group are suspended at a particular site. This status flag has three values, QUIESCING, QUIESCED, and NORMAL. When a user attempts to modify an object in a transaction, the database system performs the steps shown in FIG. 2.

Figure 2:
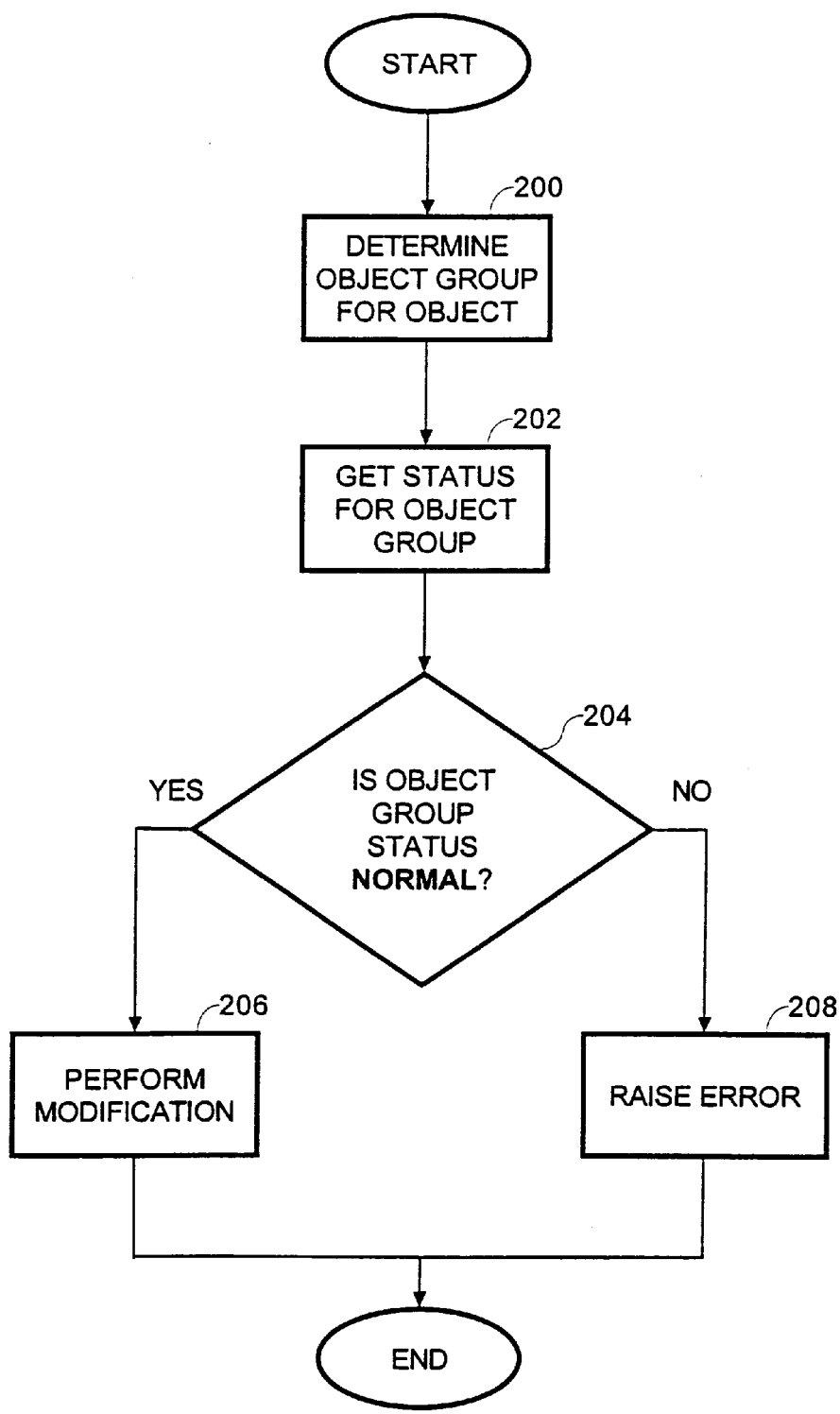
FIG. 2 is a flowchart illustrating the operation of making a modification to an object according to an embodiment of the present invention.

Referring to FIG. 2, in response to a request to modify an object, the object group for the object is determined (step 200) and the status flag for the object group is fetched (step 202). The value of the status flag is compared against the NORMAL value (step 204). If the status flag has the NORMAL value, then the modification is permitted and executed (step 206). On the other hand, if the status flag does not have the NORMAL value, then modifications to the object are disabled and an error is raised (step 208). By using a separate status flag for each object group, quiescence can be performed at a finer level of granularity than the database level. Only activities causing replication to objects in a particular object group are quiesced. Other objects, belonging to other object groups are not affected.

Consistency is promoted, because the members of an object group are chosen based on their logical relationship to each other. In other words, objects that need to be replicated together, and quiesced together, are chosen to belong to the same object group. On the other hand, completely unrelated objects may belong to different object groups, so that administrative changes to one object do not suspend modifications to unrelated objects.

DEFERRED TRANSACON QUEUE

Replication does not require an entire transaction that is executed at a source site to be re-executed at each of the destination sites. Only the changes made by the transaction to replicated data need to be propagated. Thus, other types of operations, such as read and sort operations, that may have been executed in the original transaction do not have to be re-executed at the destination sites. During asynchronous replication, updates performed by an executing transaction are recorded in a deferred transaction queue. The information recorded in the deferred transaction queue includes both the old and the new values for each data item that was updated.

The changes recorded in the deferred transaction queue are propagated to the appropriate destination sites. Each destination site first checks that its current data values agree with the transmitted "old" values. The check may fail, for example, if concurrent changes have been made to the same replicated data at different sites. If the check fails, a conflict is said to have been detected. Various techniques may be used to resolve such conflicts. If no conflict is detected, the current data values at the destination site are replaced with the transmitted "new" values.

In asynchronous replication systems, these deferred transactions are asynchronously propagated to the replication sites at an undetermined, later point in time. However, when a modification is made requiring changes to the administrative information for an object, all the previous modifications made to data objects within the object group of the data object must be applied first.

Figure 3:
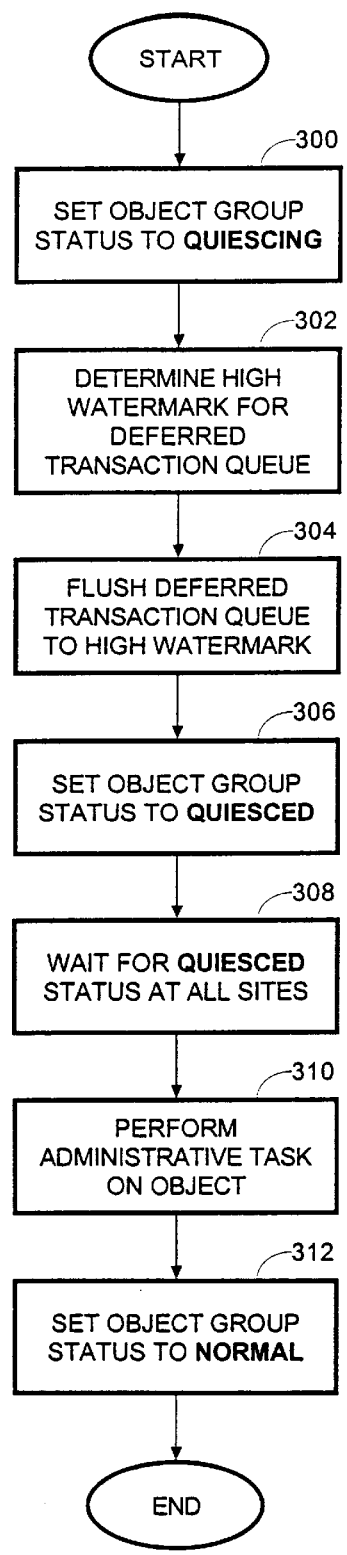
FIG. 3 is a flowchart illustrating the operation of performing an administrative function to replicated data.

Consequently, when a user requests to perform an administrative function on an object, the deferred transaction queue must flush previously queued transactions for the object group to which the object belongs. According to one embodiment of the invention, each replication site for the object group performs the steps shown in FIG. 3 in response to a request to modify the metadata for an object.

At step 300, the status flag for the object group is set to QUIESCING, and the change to the status flag is committed. Since the status flag is no longer NORMAL, the database server of that site will no longer permit, and therefore will not enqueue, update transactions to any member of the object group. Consequently, no more modifications to members of the object group are enqueued into the deferred transaction queue, although modifications of members of other, non-quiesced object groups continue to be enqueued.

After prohibiting new modifications to the members of the object group, each site determines a high watermark value for its deferred transaction queue (step 302). This high watermark value indicates the point in the queue before which all transactions for the quiescing object group are guaranteed to be located. Thus, even if new transactions, which reflect modifications to members of other object groups, continue to be enqueued to the deferred transaction queue, the new transactions are added to the queue after the point indicated by the high watermark value.

The method for determining the high watermark value will vary from implementation to implementation, but the present invention is not limited to any particular method of determining the high watermark value. Various methods exist for determining a high watermark value. Two methods, transaction serial numbers and queue batch numbers, are described herein.

TRANSACTION SERIAL NUMBERS

According to one embodiment, each transaction is stamped with a serial number that is used as a timestamp. A serial number is a monotonically increasing value which indicates the temporal order of events in the database. Thus, a transaction that occurs after another transaction has a higher serial number than the serial number of that other transaction. Consequently, in this embodiment of the invention, the high watermark value is determined by obtaining a transaction serial number after setting the object group status to QLTIESCING.

Accordingly, all transactions executed before the object group status was set to QUIESCING will have a serial number less than the serial number obtained after setting the object group status to QUIESCING. Thus, transactions in the queue with a serial number higher than the high watermark value must have been enqueued after transactions to the object group were suspended and consequently do not belong to any object in the quiescing object group.

QUEUE BATCH NUMBERS

In a preferred embodiment, the high watermark value is determined by using the next queue batch number. A queue batch number is a serial number, not of each transaction, but of each batch of transactions that are propagated at a time from the deferred transaction queue. Consequently, in this embodiment of the invention, the high watermark value is determined by obtaining a new queue batch number after setting the object group status to QUIESCING.

Accordingly, all transactions executed before the object group status was set to QUIESCING will have a queue batch number less than the queue batch number obtained after setting the object group status to QUESCING. Thus, transactions in the queue with a queue batch number higher than the high watermark value must have been enqueued after transactions to the object group were suspended and consequently do not belong to any object in the quiescing object group.

Queue batch numbers are described in more detail in pending U.S. patent application Ser. No. 08/769,740 entitled "Dequeuing Using Queue Batch Numbers," filed on Dec. 19, 1996 by Alan Demers and Sandeep Jain (attorney docket no. 3018-058), the contents of which are incorporated by reference.

FLUSHING THE DEFERRED TRANSACTION QUEUE

After the high watermark value for the deferred transaction queue is determined, the entries in the deferred transaction queue are propagated until the high watermark value is reached or until the queue is empty (step 304). In one embodiment, each transaction at the head of the queue is inspected to see if the transaction represented at the head of the queue corresponds to the high watermark value. If the transaction at the head of the queue does not correspond to the high watermark value, then it is propagated and the next one is inspected. In another embodiment, the transactions in the queue below the high watermark value are counted, then propagated. After the deferred transaction queue has been flushed to the high watermark value or becomes empty, the status flag of the object group is changed from QUIESCING to QUIESCED (step 306).

PERFORMING THE ADMINISTRATIVE FUNCTION

Each site involved in the replication of an object group waits for all the involved sites to set the status flag of the object group to QLTIESCED (step 308). After each of the involved sites has set its object group status flag to QUIESCED, the administrative function is performed (step 310). In one embodiment, determining that all replication sites have set their status flag to QUIESCED is performed by calling a callback function to inform one of the sites.

When all sites have set the status flag for that object group of QUIESCED, all previous transactions in the deferred transaction queues for the object group have been propagated to the replication sites and applied. Accordingly, no transaction queue contains transactions that may affect objects in the object group. Therefore, the administrative function can safely be applied to the metadata for the object without violating the consistency of the data. After the application of the administrative function is complete, the status flag is reset to NORMAL (step 312), allowing activities that require replication to resume for objects in the object group.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative sense and rather than a restrictive sense.

What is claimed is:

1. In a computer system comprising a plurality of sites, a method of performing an administrative function on data at a first site of said plurality of sites, said method comprising the computer implemented steps of:

creating a mapping between subsets of data and one or more object groups;

specifying one or more replication sites for each of said one or more object groups;

detecting a request to perform said administrative function to a subset of data; and if said subset of data has been mapped to an object group of said one or more object groups, then performing, at each replication site for said object group, the steps of:

suspending new transactions on the subset of data that is mapped to said object group without suspending transactions to another subset of data not mapped to said object group;

propagating to other replication sites previous transactions made to said subset of data mapped to said object group, wherein said previous transactions reflect changes made to said subset of data associated with said object group before said request was detected;

detecting that each replication site has propagated said previous transactions on said subset of data mapped to said object group to other replication sites;

in response to detecting that each replication site has propagated said previous transactions on said subset of data mapped to said object group to other replication sites, performing said administrative function to said subset of data; and resuming transactions on said subset of data mapped to said object group.

2. The method of claim 1, wherein:

the step of suspending new transactions on said subset of data mapped to said object group without suspending transactions to another subset of data not mapped to said object group includes the step of setting a status of said object group to a first status value;

the step of resuming transactions on said subset of data mapped to said object group includes the step of setting said status of said object group to a second status value; and wherein a site only allows transactions to be performed to data associated with an object group if the status of said object group is said second status value.

3. The method of claim 2, further comprising the step of:

setting said status of said object group to a third status value after performing the step of propagating previous transactions on data mapped to said object group to other replication sites;

wherein the step of detecting that each replication site has propagated said previous transactions on data mapped to said object group to other replication sites includes the step of detecting that each replication site has set each said status of said object group to said third status value.

4. The method of claim 1, wherein the step of propagating previous transactions on data mapped to said object group to other replication sites includes the steps of:

maintaining a queue of transactions to be propagated to said other sites;

associating a serial number with each of said transactions in said queue;

determining a high watermark serial number greater than any serial number associated with each of said transactions in said queue, after performing the step of suspending said new transactions; and propagating all transactions in said queue having a serial number less than said high watermark serial number.

5. The method of claim 4, wherein the step of associating a serial number with each of said transactions in said queue includes the step of associating a transaction serial number with each of said transactions in said queue, wherein said transaction serial number is unique for all transactions in said queue.

6. The method of claim 4, wherein the step of associating a serial number with each of said transactions in said queue includes the step of associating a queue batch number with each of said transactions in said queue.

7. A computer system comprising:

means for creating a mapping between subsets of data and one or more object groups;

means for detecting a request to perform an administrative function to a subset of data;

means for suspending new transactions on the subset of data that is mapped to an object group of said one or more object groups without suspending transactions to another subset of data not mapped to said object group;

means for propagating to other replication sites previous transactions made to said subset of data mapped to said object group, wherein said previous transactions reflect changes made to said subset of data associated with said object group before said request was detected;

means for detecting that each replication site has propagated said previous transactions on said subset of data mapped to said object group to other replication sites;

means for performing said administrative function to said subset of data, in response to detecting that each replication site has propagated said previous transactions on said subset of data mapped to said object group to other replication sites; and means for resuming transactions on said subset of data mapped to said object group.

8. The system of claim 7, further comprising means for preventing a modification to data associated with said object group if a status for said object group is not a second status value, wherein:

said means for suspending new transactions includes means for setting said status of said object group to a first status value; and said means for resuming transactions includes means for setting said status of said object group to said second status value.

9. The system of claim 8, further comprising means for setting said status of said object group to a third status value after propagating previous transactions on data mapped to said object group to other replication sites;

wherein said means for detecting that each replication site has propagated said previous transactions on data mapped to said object group to other replication sites includes means for detecting that each replication site has set each said status of said object group to said third status value.

10. The system of claim 7, wherein said means for propagating previous transactions on data mapped to said object group to other replication sites includes:

means for maintaining a queue of transactions to be propagated to said other sites;

means for associating a serial number with each of said transactions in said queue;

means for determining a high watermark serial number greater than any serial number associated with each of said transactions in said queue, after suspending said new transactions; and means for propagating all transactions in said queue having a serial number less than said high watermark serial number.

11. The system of claim 10, wherein said serial number is a transaction serial number.

12. The system of claim 10, wherein said serial number is a queue batch number.

13. A computer readable medium having stored thereon sequences of instructions for performing an administrative function on data at a first site of a plurality of sites, said sequences of instructions includes instructions for performing the steps of:

creating a mapping between subsets of data and one or more object groups;

specifying one or more replication sites for each of said one or more object groups;

detecting a request to perform said administrative function to a subset of data; and if said subset of data has been mapped to an object group of said one or more object groups, then performing, at each replication site for said object group, the steps of:

suspending new transactions on the subset of data that is mapped to said object group without suspending transactions to another subset of data not mapped to said object group;

propagating to other replication sites previous transactions made to said subset of data mapped to said object group, wherein said previous transactions reflect changes made to said subset of data associated with said object group before said request was detected;

detecting that each replication site has propagated said previous transactions on said subset of data mapped to said object group to other replication sites;

in response to detecting that each replication site has propagated said previous transactions on said subset of data mapped to said object group to other replication sites, performing said administrative function to said subset of data; and resuming transactions on said subset of data mapped to said object group.

14. The computer readable medium of claim 13, wherein:

the step of suspending new transactions on said subset of data mapped to said object group without suspending transactions to another subset of data not mapped to said object group includes the step of setting a status of said object group to a first status value; and the step of resuming transactions on said subset of data mapped to said object group includes the step of setting said status of said object group to a second status value.

15. The computer readable medium of claim 14, further comprising instructions for performing the step of setting said status of said object group to a third status value after performing the step of propagating previous transactions on data mapped to said object group to other replication sites;

wherein the step of detecting that each replication site has propagated said previous transactions on data mapped to said object group to other replication sites includes the step of detecting that each replication site has set each said status of said object group to said third status value.

16. The computer readable medium of claim 13, wherein the step of propagating previous transactions on data mapped to said object group to other replication sites includes the steps of:

maintaining a queue of transactions to be propagated to said other sites;

associating a serial number with each of said transactions in said queue;

determining a high watermark serial number greater than any serial number associated with each of said transactions in said queue, after performing the step of suspending said new transactions; and propagating all transactions in said queue having a serial number less than said high watermark serial number.

17. The method of claim 16, wherein the step of associating a serial number with each of said transactions in said queue includes the step of associating a transaction serial number with each of said transactions in said queue, wherein said transaction serial number is unique for all transactions in said queue.

18. The method of claim 16, wherein the step of associating a serial number with each of said transactions in said queue includes the step of associating a queue batch number with each of said transactions in said queue.

* * * * *